(12) United States Patent
Stowe

(10) Patent No.: US 6,566,660 B1
(45) Date of Patent: May 20, 2003

(54) UV DRYER FOR CURING MULTIPLE SURFACES OF A PRODUCT

(75) Inventor: Richard W. Stowe, Hillandale, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 88 days.

(21) Appl. No.: 09/690,806

(22) Filed: Oct. 18, 2000

(51) Int. Cl.[7] .................... G01N 23/00; H01J 37/20
(52) U.S. Cl. .................... 250/455.11; 250/504 R; 34/4
(58) Field of Search .................... 34/275, 4, 278; 240/41.35; 427/307; 250/504 R, 493.1, 492 R, 527; 315/39, 248, 558

(56) References Cited

U.S. PATENT DOCUMENTS

| | | | |
|---|---|---|---|
| 1,788,906 A | | 1/1931 | Brown |
| 1,984,457 A | | 12/1934 | Buttolph |
| 4,005,135 A | * | 1/1977 | Helding .................... 250/527 |
| 4,015,340 A | * | 4/1977 | Treleven .................... 34/4 |
| 4,494,316 A | | 1/1985 | Stephansen et al. |
| 4,661,264 A | | 4/1987 | Goudy, Jr. |
| 4,839,522 A | | 6/1989 | Bourgeois et al. |
| 5,204,534 A | | 4/1993 | Dubuit |
| 5,440,137 A | * | 8/1995 | Sowers .................... 250/504 R |
| 5,446,289 A | | 8/1995 | Shodeen et al. |
| 5,476,634 A | | 12/1995 | Bridges et al. |
| 5,597,597 A | | 1/1997 | Newman |
| 5,788,940 A | | 8/1998 | Cicha et al. |
| 6,256,903 B1 | * | 7/2001 | Rudd .................... 34/412 |
| 6,271,532 B1 | * | 8/2001 | Trokhan et al. .................... 250/504 R |

* cited by examiner

Primary Examiner—John R. Lee
Assistant Examiner—Phillip A. Johnston
(74) Attorney, Agent, or Firm—Shlesinger, Arkwright & Garvey LLP

(57) ABSTRACT

A UV dryer for curing multiple surfaces of a product comprises a plurality of UV lamps connected end-to-end to form an assembly having a longitudinal axis. Each lamp includes a tubular envelope aligned along the longitudinal axis. The assembly is pivotable along the longitudinal axis at ± angle from a vertical plane containing the longitudinal axis to direct radiation from the assembly toward a leading, top and trailing surface of the product as the product is moved toward, underneath, and away from the assembly, respectively.

18 Claims, 3 Drawing Sheets

UV DRYER FOR CURING MULTIPLE SURFACES OF A PRODUCT

FIELD OF THE INVENTION

The present invention is directed to a UV dryer used to cure coatings disposed on multiple surfaces of three-dimensional products.

BACKGROUND OF THE INVENTION

Ultraviolet curing uses intense ultraviolet(UV) light instead of heat to cure inks, coatings or adhesives in a very wide range of applications. Called photopolymerization, the UV curing process is photochemical, using liquid monomers and oligomers mixed with a small percent of materials called photoinitiators. When exposed to UV radiation, they instantly harden, becoming the decorative inks, tough clear coats, adhesives with a variety of properties, and many other materials filling a wide range of industrial needs.

UV radiation may be generated by microwave powered electrodeless lamps generally comprising a microwave chamber in which a longitudinally extending bulb envelope containing a plasma forming medium is disposed. The microwave chamber is comprised of a reflector for reflecting light emitted by the envelope and a mesh which is opaque to the microwave energy within the chamber, but transparent to the emitted light for allowing it to exit therefrom. The lamp is excited by microwave energy which is generated by one or more magnetrons which are coupled to the chamber through coupling slots located in the reflector.

The above described UV lamps are effective in curing coatings on generally planar two-dimensional surfaces. These surfaces are typically arranged to pass underneath the dryer in substantially perpendicular orientation to the radiation from the lamp, thereby providing essentially equal amounts of energy for an effective cure. However, when the coatings to be cured are not disposed on a single plane but are, instead, disposed on multiple surfaces at different orientations, each surface would receive different amounts of energy, depending on the orientation and distance of the surfaces relative to the lamp.

There is, therefore, a need for a UV lamp that can cure coatings disposed on multiple surfaces of a product.

OBJECTS AND SUMMARY OF THE INVENTION

It is an object of the present invention to provide a dryer for curing multiple surfaces of three-dimensional products without the necessity of reconfiguring lamps between passes, use of robots, etc.

It is another object of the present invention to provide a dryer for curing the leading and trailing surfaces of three-dimensional products by providing a pivoting motion to the dryer as the product moves along a conveyor underneath the dryer.

In summary, the present invention provides a UV dryer for curing multiple surfaces of a three-dimensional product comprising a plurality of UV lamps connected end-to-end to form an assembly having a longitudinal axis. Each lamp includes a tubular envelope aligned along the longitudinal axis. The assembly is pivotable along the longitudinal axis at a ± angle, preferably 45°, from a vertical plane containing the longitudinal axis to direct radiation from the assembly toward a leading, top and trailing surface of the product as the product is moved toward, underneath, and away from the assembly, respectively.

These and other objects of the present invention will become apparent from the following detailed description.

DETAILED DESCRIPTION OF THE INVENTION

Figure 1:
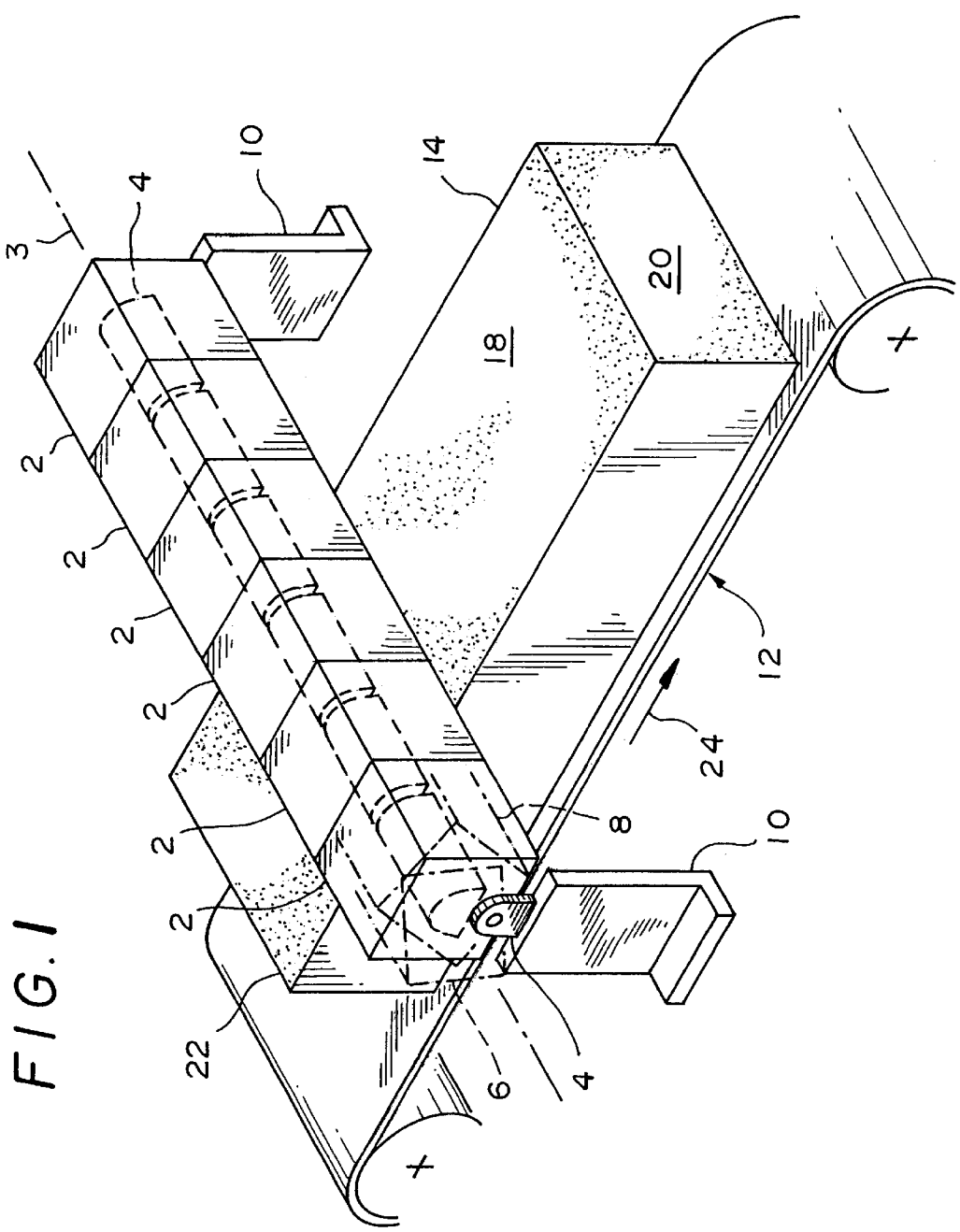
FIG. 1 is a schematic perspective view of a dryer comprising an assembly of UV lamps made in accordance with the present invention used to cure coatings on surfaces of large three dimensional products.

Referring to FIG. 1, UV dryer comprising an assembly of a plurality of electrodeless UV lamps 2 are connected end to end along a longitudinal axis 3. The assembly of lamps is pivotable about pivots 4 at opposite ends of the assembly to allow pivoting of the assembly about an angle, preferably ±45°, as generally shown at 6 and 8, about a reference vertical plane containing the longitudinal axis. Support structures 10 elevate the lamps above a conveyor 12 used to move a product 14 underneath the lamps for three-dimensional curing.

The product 14 is shown schematically as a rectangular block to represent a three-dimensional item, but it should be understood that it can be of any shape. The product 14 has multiple surfaces requiring curing, such as top surface 18, leading surface 20 and trailing surface 22 relative to the direction of travel 24 of the conveyor.

Figure 2:
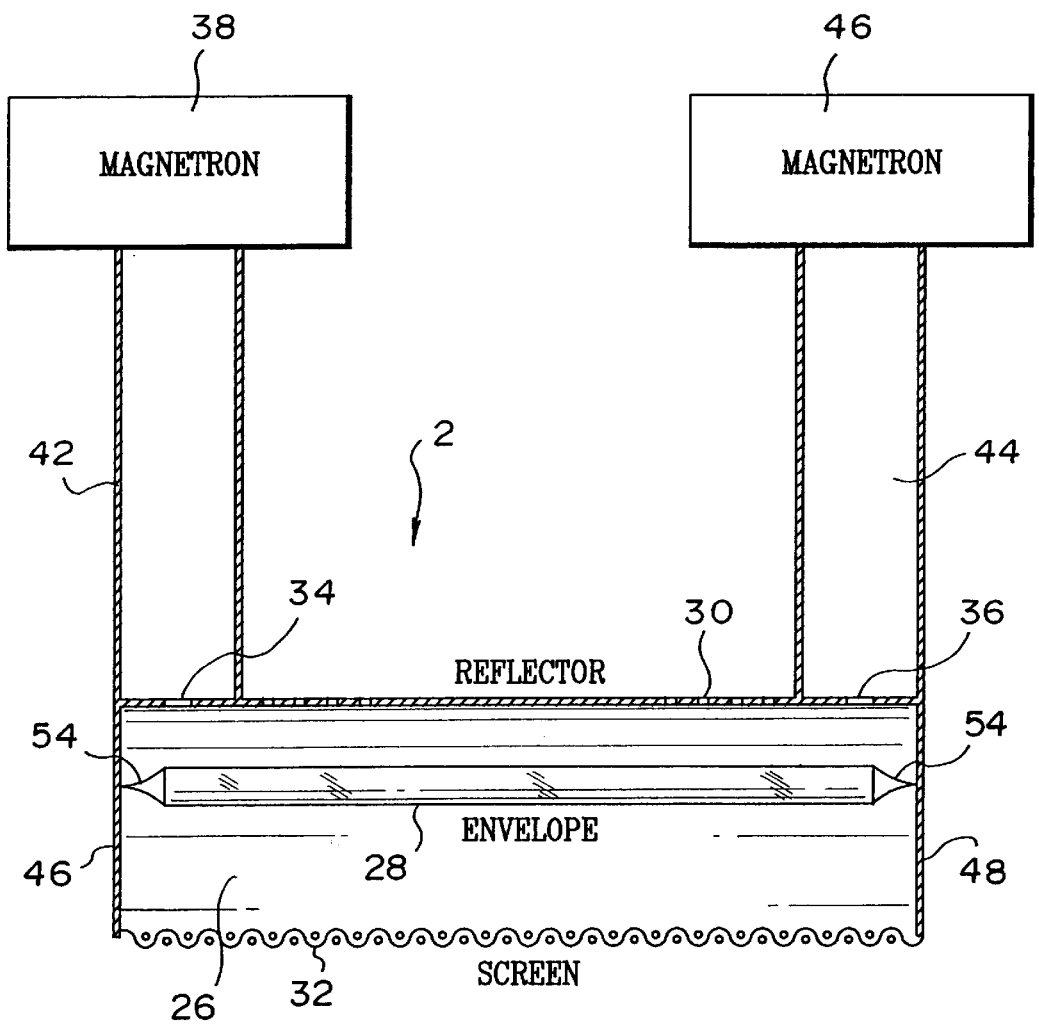
FIG. 2 is a schematic diagram showing the components of a magnetron powered UV lamp, which forms one of several lamps joined end to end to form the assembly shown in FIG. 1.

Referring to FIG. 2, each of the lamps 2 comprises a microwave chamber 26 in which an elongated lamp envelope 28 containing a plasma forming medium is disposed. Each lamp envelope 28 is aligned along the longitudinal axis. The microwave chamber is comprised of a metallic reflector 30 and a metallic mesh 32 that covers the entire bottom of the microwave chamber 26. The reflector 30 is preferably of an elliptical shape and is effective to reflect ultraviolet or other light emitted by the lamp envelope 28 out of the chamber through the mesh 32. The mesh is made of metallic material and is effectively opaque to microwave energy while being effectively transparent to radiation at the ultraviolet and visible part of the spectrum. The reflector has two coupling slots 34 and 36. Microwave energy is generated by magnetrons 38 and 40 connected to the microwave chamber by means of waveguides 42 and 44. Examples of electrodeless UV lamps are disclosed in U.S. Pat. Nos. 4,042,850, 4,504,768, 4,359,668, 5,686,793, and 5,838,108, which are incorporated herein by reference.

End reflectors 46 and 48 include envelope holders disposed at positions 50 and 52, as shown in FIG. 2. The holders may be in the form of holes adapted to receive the opposite end portions, called nibs, of the envelope 28. The position 50 is located at true optical foci for the elliptical reflector 30. The position 52 is displaced from the true optical foci towards the crown portion of the reflector.

Figure 4:
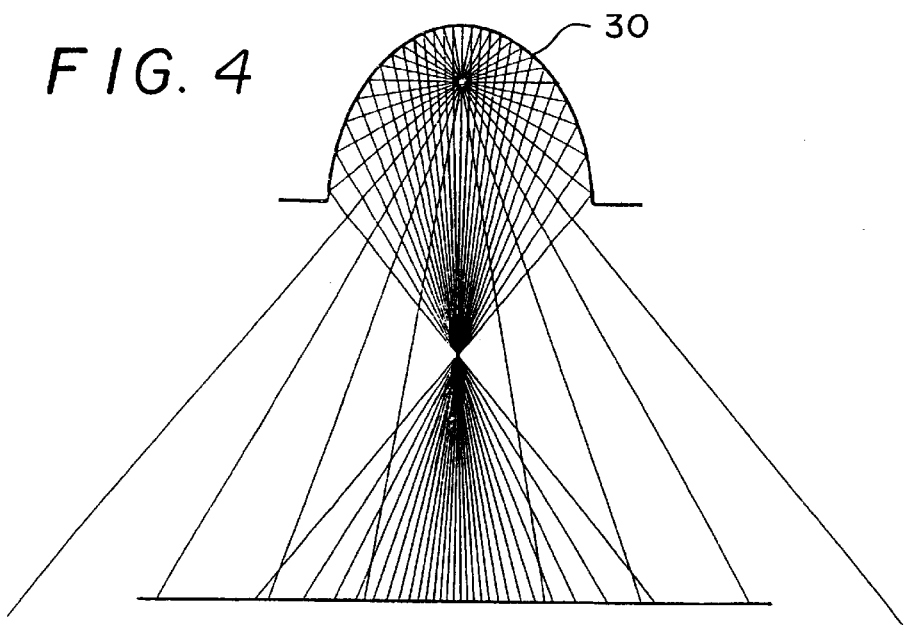
FIG. 4 is a ray diagram of an elliptical reflector with a bulb envelope located at its true optical foci.

Referring to FIG. 4, the envelope 28 located at focal position 50 exhibits a serious fall-off of energy in the far-field. The ray divergence beyond the focal point causes the irradiance to drop-off badly. For curing a coating on a planar two-dimensional surface, it is preferred to focus the lamp output on the surface (near-field) for maximum power intensity. However, where the coatings are disposed on several surfaces, each surface being located at different distances and orientation with respect to the foci, it would be difficult to focus the lamp on all the surfaces. In this case, focus becomes a problem, since each surface would not receive uniform energy treatment as the product passes underneath the lamp.

Figure 5:
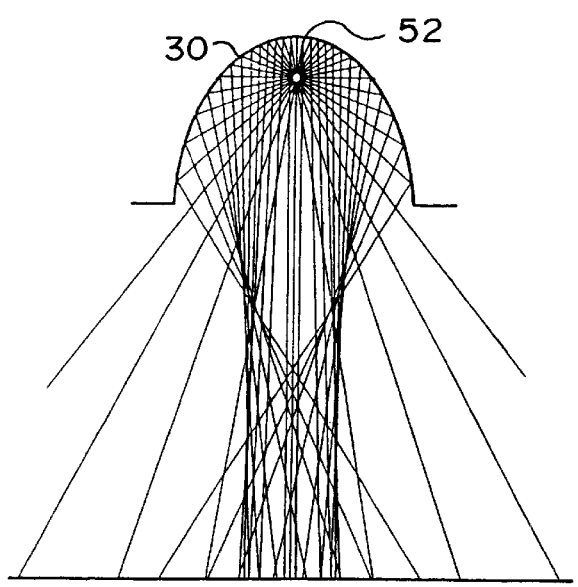
FIG. 5 is a ray diagram of an elliptical reflector having a bulb envelope located at a defocused foci.
Figure 3:
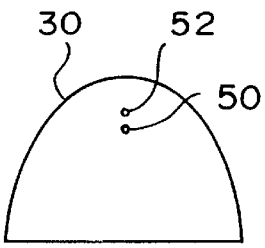
FIG. 3 is an end reflector showing focused and defocused locations for the bulb envelope.
Figure 6:
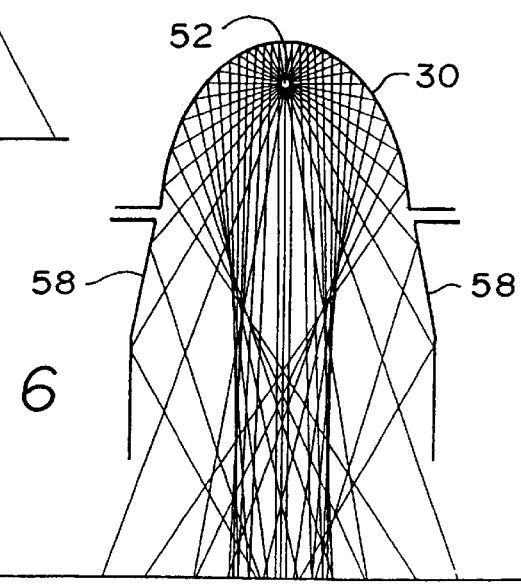
FIG. 6 is ray diagram of the reflector of FIG. 5 including external box reflectors.

Referring to FIG. 5, the lamp envelope 28 is located at the defocused location 52. It is seen that its output is not focused but the rapid drop-off in irradiance beyond the focal point is not present. Instead, irradiance is improved in the far-field, increasing the ratio of energy available to a farther surface versus a nearer surface to the lamp. This is advantageous since the energy received by each surface of the multi-surface product 14 would not vary substantially as compared to focused lamp. Referring to FIG. 6, box reflectors 58 are provided to further increase the energy per unit area provided by the envelope located at the defocused location 52. The shapes of the box reflectors 58 may vary, depending on the application, the clear distance from the lamp and the irradiance desired.

Although the dryer 2 has been disclosed as being made up of microwave powered lamps, a person of ordinary skill in the art will understand that other types of UV lamps, such as arc lamps, may be also used. Further, a single lamp may used, instead of multiple lamps, if the size of the product requires only a single lamp.

In operation, the assembly is pivoted, as generally shown at 8, towards the product 14 as it approaches the assembly to cure the leading surface 20. The assembly is then pivoted to its perpendicular-to-the-conveyor position as the product passes directly underneath the lamps. As the product moves away from the lamps, the assembly is rotated, as generally shown at 6, towards the trailing surface 22. By locating the envelopes 28 at the defocused locations 52, the irradiance does not fall-off rapidly beyond the focal point, thereby providing greater energy levels for the various surfaces of the product 14.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A UV dryer for curing multiple surfaces of a product, comprising:
   a) a plurality of UV lamps connected end-to-end to form an assembly having a longitudinal axis;
   b) each lamp including a linear envelope aligned along said longitudinal axis; and
   c) said assembly is pivoted about said longitudinal axis ± an angle from a vertical plane containing said longitudinal axis as the product is.moving to direct radiation from said assembly toward a leading, top and trailing surface of the product as the product is moved toward, underneath, and away from the assembly, respectively.

2. A UV dryer as in claim 1, wherein said angle is about 45°.

3. A UV dryer as in claim 1, wherein said lamps are microwave powered.

4. A UV dryer as in claim 1, wherein said lamps each includes an elliptical reflector.

5. A UV dryer as in claim 4, wherein:
   a) said lamps each includes a pair of end reflectors having defocused positions; and
   b) said envelopes are disposed at said defocused positions.

6. A UV dryer as in claim 1, wherein said lamps each includes external reflectors.

7. A dryer for curing multiple surfaces of a product, comprising:
   a) at least one dryer to irradiate multiple surfaces on a 3-dimensional product moving into and out of an irradiation zone;
   b) a pivot to orient said at least one dryer at first, second and third positions, said first position being oriented toward a leading surface of the product as it moves into the irradiation zone, said second position being directly perpendicularly onto the product as it moves underneath the irradiation zone and said third position being toward a trailing surface of the product as the product moves away from the irradiance zone; and
   c) said at least one dryer is pivoted about said pivot as the product moves toward, underneath and away from said at least one dryer.

8. A method for curing multiple surfaces of products, comprising:
   a) providing a dryer having an irradiance zone;
   b) tilting the dryer toward the leading surface of the product so that the irradiance zone is directed toward the leading surface as the product moves toward the dryer;
   c) directing the dryer perpendicularly to the top surface of the product so that the irradiance zone is directed toward the top surface of the product as the product moves directly underneath the dryer; and
   d) tilting the dryer toward the trailing surface of the product so that the irradiance zone is directed toward the trailing surface of the product as the product moves away from the dryer.

9. A method as in claim 8, wherein the dryer is tilted ±45° from a vertical reference plane.

10. A UV dryer for curing multiple surfaces of product, comprising:
    a) a plurality of UV lamps configured into an assembly along a line;
    b) each lamp including a linear envelope aligned along said line; and
    c) said assembly is pivoted about an axis ± an angle from a vertical plane containing said axis as the product is moving to direct radiation from said assembly toward a leading, top and trailing surface of the product as the product is moved toward, underneath, and away from the assembly, respectively.

11. A UV dryer as in claim 10, wherein said lamps are configured end-to-end.

12. A UV dryer as in claim 10, wherein said line is a longitudinal axis of said assembly.

13. An apparatus as in claim 7, wherein:
    a) said at least one dryer being pivotable along a longitudinal axis ± an angle from a vertical plane containing said longitudinal axis to direct radiation from said at least dryer toward the leading, top and trailing surfaces of the product as the product is moved toward, underneath, and away from said at least dryer, assembly, respectively.

14. An apparatus as in claim 13, wherein said angle is about 45°.

15. An apparatus as in claim 7, wherein said at least one dryer includes a microwave powered UV lamp having a linear envelope.

16. An apparatus as in claim 15, wherein said UV lamp includes an elliptical reflector.

17. An apparatus as in claim 16, wherein:
a) said lamp includes a pair of end reflectors having defocused positions; and
b) said envelope is disposed at said defocused positions.

18. An apparatus as in claim 16, wherein said lamp includes external reflectors.

* * * * *